US012732344B2

(12) United States Patent
Lian

(10) Patent No.: US 12,732,344 B2
(45) Date of Patent: Sep. 8, 2026

(54) AUTHORITY MANAGEMENT METHOD

(71) Applicant: ZHUHAI PANTUM ELECTRONICS CO., LTD., Guangdong (CN)

(72) Inventor: Wei Lian, Guangdong (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 156 days.

(21) Appl. No.: 18/537,666

(22) Filed: Dec. 12, 2023

(65) Prior Publication Data

US 2024/0214183 A1 Jun. 27, 2024

(30) Foreign Application Priority Data

Dec. 21, 2022 (CN) ........................ 202211650079.3

(51) Int. Cl.
*H04L 9/08* (2006.01)
*H04L 9/32* (2006.01)

(52) U.S. Cl.
CPC .......... *H04L 9/0825* (2013.01); *H04L 9/3213* (2013.01)

(58) Field of Classification Search
None
See application file for complete search history.

(56) References Cited

U.S. PATENT DOCUMENTS

2013/0340070 A1 12/2013 Iizuka et al.
2019/0197533 A1* 6/2019 Edwards ........... G06Q 20/3825
2021/0282011 A1* 9/2021 Tachibana ............. H04W 12/06
2021/0367756 A1* 11/2021 Pham ........................ H04L 9/14
2024/0380616 A1* 11/2024 Woodage ............. H04L 9/3247

FOREIGN PATENT DOCUMENTS

| | | | | | |
|---|---|---|---|---|---|
| CN | 113221074 | A | | 8/2021 | |
| CN | 113612744 | A | | 11/2021 | |
| JP | 2007034814 | A | * | 2/2007 | |
| WO | 2021074224 | A1 | | 4/2021 | |
| WO | WO-2021080316 | A1 | * | 4/2021 | H04L 9/3268 |

OTHER PUBLICATIONS

European Patent Office, Extended European Search Report Issued in Application No. 23218408.5, Apr. 24, 2024, Germany, 9 pages.
State Intellectual Property Office of the People's Republic of China, Office Action and Search Report Issued in Application No. 202211650079.3, Jun. 26, 2026, 32 pages. (Submitted with Machine Translation).

* cited by examiner

*Primary Examiner* — Bassam A Noaman
(74) *Attorney, Agent, or Firm* — McCoy Russell LLP

(57) ABSTRACT

An authority management method. The method is applied to a first terminal device, and includes: sending a first authority application request to an authority management device, the first authority application request being configured to apply for a first authority, the first authority being an authority that is desired to be obtained by the first terminal device, and the first authority being a task authority for an execution device; and receiving a first authorization information block sent by the authority management device, the first authorization information block including first authorization information encrypted by a first private key, the first authorization information including description information for the first authority, the first private key being a key matching a first public key, and the first public key is stored in the execution device.

17 Claims, 6 Drawing Sheets

<table>
<tr><td colspan="3">Authorization information block</td></tr>
<tr><td>Authorizer identity</td><td>Authorized-object identity</td><td>Authorization moment</td></tr>
<tr><td>Authorization period</td><td>Client certificate of offline authorization client</td><td>Appended token information summary</td></tr>
<tr><td>Authority range:</td><td colspan="2">+Black and white printing, color printing<br>+Copying, scanning to files, scanning to emails<br>+Device parameter setting, device initialization</td></tr>
<tr><td>Consumable portion:</td><td colspan="2">+Color A4 printing: 100 pages<br>+Black and white A4 copying: 100 pages</td></tr>
<tr><td colspan="3">Hash signature and other additional information</td></tr>
</table>

FIG. 3

<table>
<tr><td colspan="6">Authorization information block</td></tr>
<tr><td>Authorizer identity</td><td colspan="2">Authorized-object identity</td><td colspan="2">Authorized-object public key</td><td>Authorization moment</td></tr>
<tr><td>Authorization period</td><td colspan="3">Client certificate of offline authorization client</td><td colspan="2">Appended token information summary</td></tr>
<tr><td colspan="2">Authority range</td><td colspan="4">Authority range allowed to perform secondary authorization</td></tr>
<tr><td colspan="2"></td><td colspan="4">+Black and white printing<br>+Copying<br>+Device parameter setting</td></tr>
<tr><td colspan="6">Consumable portion: +Color A4 printing: 100 pages<br>+Black and white A4 copying: 100 pages</td></tr>
<tr><td colspan="6">Hash signature and other additional information</td></tr>
</table>

AUTHORITY MANAGEMENT METHOD

CROSS-REFERENCE TO RELATED APPLICATIONS

The present application claims priority to Chinese Patent Application No. 202211650079.3, filed on Dec. 21, 2022, the content of which is incorporated herein by reference in its entirety.

TECHNICAL FIELD

The present disclosure relates to the technical field of electronic computer and, in particular, to an authority management method.

BACKGROUND

A printer is one of the output devices of a terminal device (computer), and is used to print a processing result (printing task) issued by the terminal device onto relevant medium.

In many application scenarios for a printer, the printer is a device that is shared by and connected to multiple terminal devices. considering data security and in order to prevent the printer from executing a printing task issued by an illegal terminal device, in some application scenarios for a printer, the printer needs to authenticate the terminal device that issues a printing task before actually executing this printing task, and only the printing task issued by the authorized terminal device can be executed.

In an authentication method, the printer is connected to an authentication center (such as Kerberos, LDAP) and authenticates the terminal device that issues a printing task through the authentication center. However, in this method, when the printer is in an offline state due to network issues or requirements for actual application scenarios, the authentication center cannot be connected, and thus the printer cannot authenticate the terminal device.

Therefore, an authority management method is desired to enable an execution device (such as printer) to perform authentication in an offline state.

SUMMARY

Regarding the problem that how to enable the execution device (such as printer) to authenticate the terminal device in an offline state, the present disclosure provides an authority management method and an electronic device, and further provides a computer-readable storage medium.

The embodiments of the present disclosure include the following technical solutions:

In a first aspect, the present disclosure provides an authority management method, which is applied to a first terminal device and includes: sending a first authority application request to an authority management device, wherein the first authority application request is used to apply for a first authority, the first authority is an authority that is desired to be obtained by the first terminal device, and the first authority is a task authority for an execution device; and receiving a first authorization information block sent by the authority management device, wherein the first authorization information block includes first authorization information encrypted by a first private key, the first authorization information includes description information for the first authority, the first private key is a key matching a first public key, and the first public key is stored in the execution device.

In an implementation of the first aspect, the method further includes: sending the first authorization information block to the execution device when a task needs to be sent to the execution device.

In an implementation of the first aspect, wherein the first authority application request includes a second public key, the second public key is a key matching a second private key, and the second public key and the second private key are stored in the first terminal device. The first authority application request is further configured to apply for a second authority, the second authority is an authority that allows the first terminal device to authorize another terminal device, and the second authority is a task authority for the execution device. The first authorization information further includes description information for the second authority, and the second public key.

In an implementation of the first aspect, the method further includes: receiving a second authority application request sent by a second terminal device, wherein the second authority application request is configured to apply for a third authority, the third authority is an authority that is desired to be obtained by the second terminal device, and the third authority is a task authority for the execution device; generating second authorization information based on the second authority application request, wherein the second authorization information includes description information for the third authority; encrypting the second authorization information using the second private key to generate a second authorization information block; generating a first authorization information chain, wherein the first authorization information chain includes the first authorization information block and the second authorization information block; and sending the first authorization information chain to the second terminal device.

In an implementation of the first aspect, the second authority application request includes a third public key, the third public key is a key matching a third private key, and the third public key and the third private key are stored in the second terminal device; the second authority application request is further configured to apply for a fourth authority, the fourth authority is an authority that allows the second terminal device to authorize other terminal devices, and the fourth authority is a task authority for the execution device; and during said generating second authorization information based on the second authority application request, the second authorization information further includes description information for the fourth authority, and the third public key.

In an implementation of the first aspect, the first authorization information includes one or a combination of an authorizer identity, an authorized-object identity, an authorization moment, an authorization period, an authority range, and a consumable share.

In an implementation of the first aspect, the first authorization information includes a subsidiary token information summary of a subsidiary token bound with the first authorization information; and the method further includes: receiving the subsidiary token sent by the authority management device.

In a second aspect, the present disclosure provides an authority management method, which is applied to a second terminal device and includes: sending a second authority application request to a first terminal device, wherein the second authority application request is used to apply for a third authority, the third authority is an authority that is desired to be obtained by the second terminal device, and the third authority is a task authority for an execution device; and receiving a first authorization information chain sent by the first terminal device, wherein the first authorization information chain includes authorization information blocks; wherein the first one authorization information block of the authorization information blocks of the first authorization information chain includes first authorization information encrypted by a first private key, the first private key is a key matching a first public key, and the first public key is stored in the execution device; each authorization information block of the first authorization information chain includes authorization information encrypted by a private key; the authorization information of each authorization information block of the first authorization information chain includes a public key matching the private key configured to encrypt the authorization information in a next one authorization information block; and the authorization information of a last one authorization information block of the authorization information blocks of the first authorization information chain includes description information for the third authority.

In an implementation of the second aspect, the method further includes: sending the first authorization information chain to the execution device when a task needs to be sent to the execution device.

In an implementation of the second aspect, the second authority application request includes a third public key, the third public key is a key matching a third private key, and the third public key and the third private key are stored in the second terminal device; the second authority application request is also used to apply for a fourth authority, the fourth authority is an authority that allows the second terminal device to authorize another terminal device, and the fourth authority is a task authority for the execution device; and the authorization information of the last one authorization information block of the authorization information blocks of the first authorization information chain further includes description information for the fourth authority, and the third public key.

In an implementation of the second aspect, the method further includes: receiving a third authority application request sent by a third terminal device, wherein the third authority application request is used to apply for a fifth authority, the fifth authority is an authority that is desired to be obtained by the third terminal device, and the fifth authority is a task authority for the execution device; generating third authorization information based on the third authority application request, wherein the third authorization information includes description information for the fifth authority; encrypting the third authorization information using the third private key to generate a third authorization information block; adding the third authorization information block to a tail of the first authorization information chain to generate a second authorization information chain; and sending the second authorization information chain to the third terminal device.

In an implementation of the second aspect, authorization information of each authorization information block of the first authorization information chain includes one or a combination of an authorizer identity, an authorized-object identity, an authorization moment, an authorization period, an authority range, and a consumable share.

In an implementation of the second aspect, the first authorization information includes a subsidiary token information summary of a subsidiary token bound with the first authorization information; and the method further includes: receiving the subsidiary token sent by the first terminal device.

In a third aspect, the present disclosure provides an authority management method, which is applied to the authority management device and includes: receiving a first authority application request sent by a first terminal device, wherein the first authority application request is used to apply for a first authority, the first authority is an authority that is desired to be obtained by the first terminal device, and the first authority is a task authority for an execution device; generating first authorization information based on the first authority application request, wherein the first authorization information includes description information for the first authority; encrypting the first authorization information using a first private key to generate a first authorization information block, wherein the first private key is a key matching a first public key, and the first public key is stored in the execution device; and sending the first authorization information block to the first terminal device.

In an implementation of the third aspect, the first authority application request includes a second public key, the second public key is a key matching a second private key, and the second public key and the second private key are stored in the first terminal device; the first authority application request is also used to apply for a second authority, the second authority is an authority that allows the first terminal device to authorize other terminal devices, and the second authority is a task authority for the execution device; the first authority application request generates the first authorization information, first authority application request, the first authorization information further includes description information for the second authority, and the second public key.

In an implementation of the third aspect, the first authorization information includes one or a combination of an authorizer identity, an authorized-object identity, an authorization moment, an authorization period, an authority range, and a consumable share.

In an implementation of the third aspect, the first authorization information includes a subsidiary token information summary of a subsidiary token bound with the first authorization information; and the method further includes: generating the subsidiary token; and sending the subsidiary token to the first terminal device.

In a fourth aspect, the present disclosure provides an authority management method, which is applied to the execution device and includes: receiving a first authorization information block sent by a terminal device, wherein the first authorization information block includes first authorization information encrypted by a first private key, the first private key is a key matching a first public key, and the first public key is stored in the execution device; and decrypting the first authorization information block using the first public key to obtain the first authorization information.

In an implementation of the fourth aspect, the first authorization information block is generated by an authority management device based on an authority application request of the terminal device.

In an implementation of the fourth aspect, the method further includes: verifying legality of the first authorization information; obtaining authority information of the terminal device based on the first authorization information in response to verification success of the first authorization information; and determining whether to execute a task issued by the terminal device based on the authority information of the terminal device.

In an implementation of the fourth aspect, said receiving a first authorization information block sent by a terminal device includes: receiving an authorization information chain sent by the terminal device, wherein the authorization information chain includes authorization information blocks encrypted by different private keys, a first one authorization information block of the authorization information blocks of the authorization information chain is the first authorization information block, and the authorization information of each authorization information block of the authorization information chain includes a public key matching a private key configured to encrypt the authorization information in a next one authorization information block; and the method further includes: obtaining a public key matching the next one authorization information block from the authorization information of each decrypted authorization information block to decrypt the next one authorization information block, and obtaining the authorization information of the next one authorization information block, wherein the public key matching a second authorization information block is obtained from the first authorization information to decrypt the second authorization information block, to obtain the authorization information of the second authorization information block; verifying legality of the authorization information of a last one authorization information block of the authorization information blocks of the authorization information chain; obtaining authority information of the terminal device based on the authorization information of the last one authorization information block of the authorization information blocks in response to verification success of the authorization information of the last one authorization information block of the authorization information blocks; and determining whether to execute a task issued by the terminal device based on the authority information of the terminal device.

In an implementation of the fourth aspect, the first authorization information includes one or a combination of an authorizer identity, an authorized-object identity, an authorization moment, an authorization period, an authority range, and a consumable share.

In an implementation of the fourth aspect, the first authorization information includes a subsidiary token information summary of a subsidiary token bound with the first authorization information; and the method further includes: receiving the subsidiary token sent by the terminal device, and verifying whether the subsidiary token matches the first authorization information.

In a fifth aspect, the present disclosure provides an electronic device, which includes a memory for storing computer program instructions and a processor for executing the computer program instructions. When the computer program instructions are executed by the processor, the electronic device is triggered to execute steps of the methods described in the first, second, third, or fourth aspect.

In a sixth aspect, the present disclosure provides a computer-readable storage medium in which a computer program is stored. When running on a computer, the computer program causes the computer to execute the methods described in the in the first, second, third, or fourth aspect.

According to the methods of embodiments of the present disclosure, during the authentication process, the execution device does not need to be connected to the authority management device, and the execution device does not require user identity information or authority information, thereby reducing a risk of user private data leakage and improving the security of authentication's authorizated.

BRIEF DESCRIPTION OF DRAWINGS

FIG. 3 is a schematic diagram of an authorization information block according to an embodiment of the present disclosure;

FIG. 5 is a schematic diagram of an authorization information block according to an embodiment of the present disclosure;

FIG. 6 is a schematic diagram of an authorization topology structure according to an embodiment of the present disclosure.

DESCRIPTION OF EMBODIMENTS

In order to better illustrate the purpose, technical solutions, and advantages of the present disclosure, the following will provide a more detailed description of the technical solutions of the present disclosure in conjunction with embodiments and corresponding drawings. It should be noted that, the described embodiments are merely some, rather than all of the embodiments of the present disclosure. Based on the embodiments of the present disclosure, all other embodiments obtained by those skilled in the art without any creative effort fall within a scope of the present disclosure.

The terms used in the implementations of the present disclosure are only intended to explain the embodiments of the present disclosure, and are not intended to limit the present disclosure.

Figure 1:
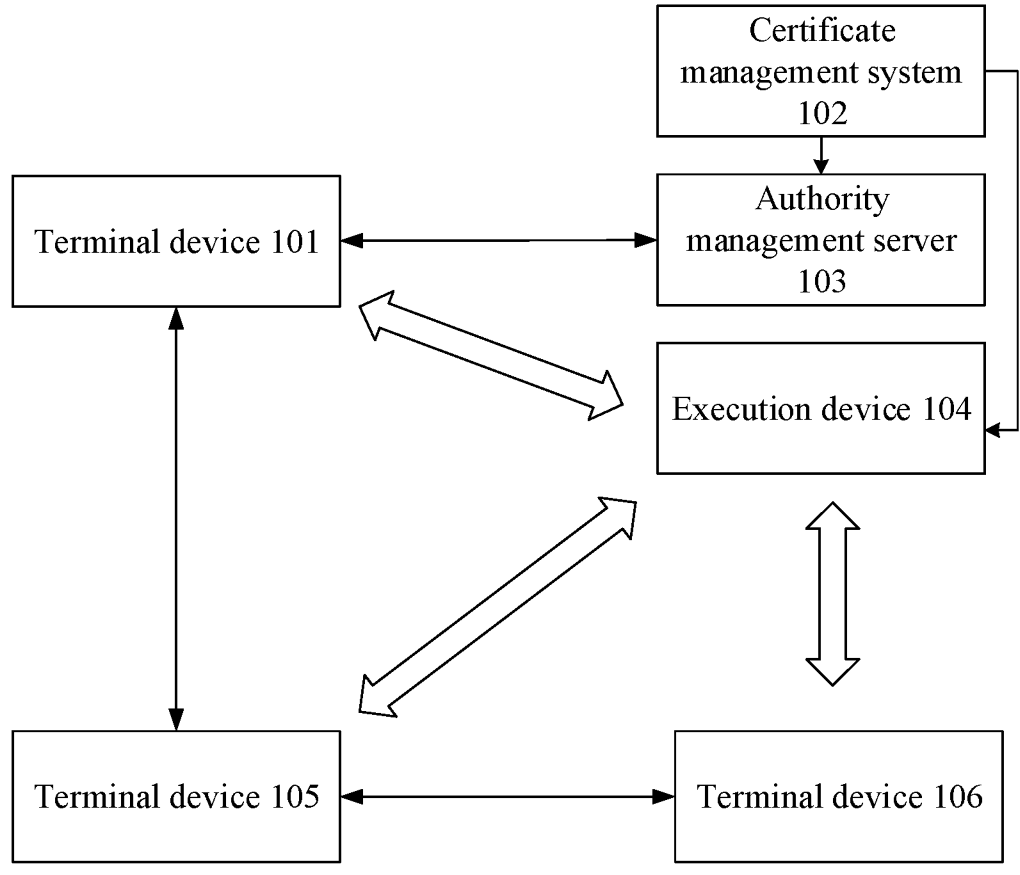
FIG. 1 is a schematic diagram of a device according to an embodiment of the present disclosure.

FIG. 1 shows a schematic diagram of a device interaction application according to an embodiment of the present disclosure.

As shown in FIG. 1, a terminal device 101 is a device that issues a task. The terminal device 101 may be any terminal device such as a mobile phone, a tablet, a laptop, and a desktop computer.

An execution device 104 performs authentication on the terminal device 101. After being authenticated, the task issued by the terminal device 101 is executed by the execution device 104. The execution device 104 may be an image forming device, such as printer, copier, scanner, fax machine, and all-in-one machine that integrates printing and copying functions.

Regarding the problem of how to enable the execution device 104 to authenticate the terminal device 101 when the execution device 104 is in an offline state, a feasible solution is to maintain user information base and store authority information of each user by the execution device 104. In this way, the execution device 104 can authorize the terminal device 101 without keeping the execution device 104 online. However, as the execution device 104 is a shared device, saving user authority information within the execution device 104 increases a risk of user authority information leakage.

In order to enable the execution device 104 to authorize the terminal device 101 when the execution device 104 is in an offline state and reduce the risk of user authority information leakage, an embodiment of the present disclosure provides an authorization management scheme. As shown in FIG. 1, in the scheme of an embodiment of the present disclosure, the terminal device 101 is authorized by an authority management server 103, and authorization information of the terminal device 101 is not stored in the execution device 104. When the execution device 104 preforms authorization on the terminal device 101, the execution device 104 does not need to connect to the authority management server 103.

Figure 2:
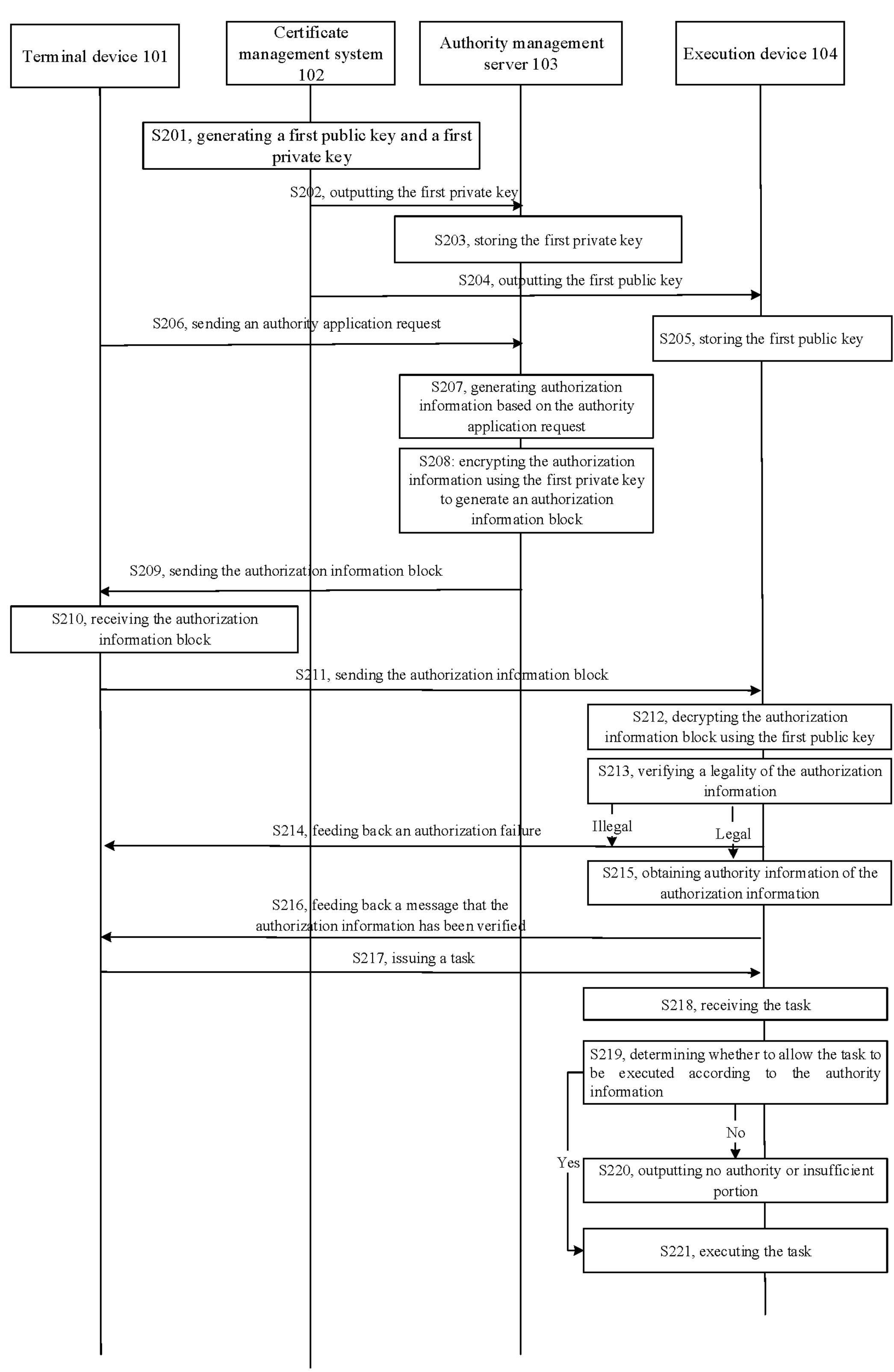
FIG. 2 is a flowchart of an authority management method according to an embodiment of the present disclosure.

FIG. 2 shows a flowchart of an authority management method according to an embodiment of the present disclosure.

The following process shown in FIG. 2 is executed by the device shown in FIG. 1 to authorize a printer in an offline state.

S201, a first public key and a first private key that are asymmetrically encrypted (the first public key and the first private key matching each other) are generated by a certificate management system 102.

S202, the first private key is output by the certificate management system 102 to the authority management server 103.

S203, the first private key is stored in the authority management server 103.

S204, the first public key is output by the certificate management system 102 to the execution device 104.

S205, the first public key is stored in the execution device 104.

In an embodiment, in an implementation of step S205, a mode of the execution device 104 is set to be an initialization mode, and the first public key is installed in the initialization mode.

In an embodiment of the present disclosure, the first public key and the first private key are generated by the certificate management system 102, and the generation device and storage device of the keys are separated, which can improve the security of the keys. In another embodiment of the present disclosure, the first public key and the first private key may also be generated by the authority management server 103.

S206, an authority application request is sent by the terminal device 101 to the authority management server 103, and the authority application request is used to apply for a usage authority of the terminal device 101 for the execution device 104.

In an embodiment, in an implementation of step S206, the authority application request includes an identity of a subject which desires to obtain an authority (the identity of the authorized object, such as identity of the terminal device 101 or user identity of a user account logged in the terminal device 101).

Further, in an implementation of step S206, the authority application request includes an expected authorization moment for the authority (i.e., a moment when the authorization starts taking effect), an expected authorization period for the being authority (i.e., a period during which the authorization takes effect), and an expected authorization range for the authority (such as black and white printing, color printing, copying, scanning to files, scanning to emails, device parameter setting, and device initialization). Further, in an application where the execution device 104 is a printer, the authority application request further includes an expected consumable share for the authority (such as color A4 printing (100 pages), black and white A4 copying (100 pages)).

In another implementation of step S206, one or more of the authorization moment, the authorization period, the authorization range, and the consumable share mentioned above may not be provided by the terminal device 101 (not included in the authority application request), but rather by the authority management server 103 searching for the corresponding record in authority registration information based on the identity of the object which desires to obtain the authority.

S207, the authorization information for the terminal device 101 is generated by the authority management server 103 based on the authority application request.

In an embodiment, in an implementation of step S207, the authorization information includes the authorized-object identity, an authorization moment, an authorization period, and an authorization range. Further, in the application where the execution device 104 is a printer, the authorization information includes a consumable share.

Further, in order to trace a source of authorization, in an implementation of step S207, the authorization information further includes an authorizer identity (such as identity of the authority management server 103 or administrator identity of an authority administrator logged in the authority management server 103).

Further, in order to prevent other terminal devices other than the terminal device 101 from stealing the authorization information of the terminal device 101, in an implementation of step S207, the authorization information includes a client certificate of an offline authorization client (a client certificate of the terminal device 101). The client certificate of the offline authorization client is provided by the terminal device 101 (included in the authority application request).

Further, in an implementation of step S207, the authorization information further includes a Hash signature and other additional information (such as authorization information length, check code, and an authorization information format identification code).

S208, the authorization information is encrypted by the authority management server 103 using the first private key to generate an authorization information block.

Further, in order to improve data security, in an implementation of step S208, the authorization information block is issued by the authority management server 103 using an administrator certificate. The authorization information block represents an authorization information block issued by the authority administrator.

S209, the authorization information block is sent by the authority management server 103 to the terminal device 101.

S210, the authorization information block is received by the terminal device 101.

In an embodiment, an interaction between the authority management server 103 and the terminal device 101 is achieved by secure means (such as encrypted email system and special data transmission medium).

Further, in order to improve data security and avoid authorization block leakage that would lead to authority stealing, in an implementation, the authority management server 103 not only generates the authorization information, but also generates a subsidiary token bound with the authorization information (in an embodiment, the subsidiary token is a randomly generated numeric string with a fixed length). In step S209, the authorization information block and the subsidiary token bound with the authorization information are fed back to the terminal device 101 by the authority management server 103. The authorization information block and the subsidiary token may be packaged and sent at once or sent separately.

In an embodiment, in an implementation of step S207, the authorization information further includes a subsidiary token information summary. A binding relationship between the authorization information and the subsidiary token can be verified by verifying a matching relationship between the subsidiary token and the subsidiary token information summary of the authorization information.

FIG. 3 is a schematic diagram of an authorization information block according to an embodiment of the present disclosure.

As shown in FIG. 3, the authorization information block includes the authorizer identity, the authorized-object identity, the authorization moment, the authorization period, the subsidiary token information summary, the client certificate of the offline authorization client, the authority range, the consumable share, the Hash signature, and other additional information.

After the authorization information block is received by the terminal device 101, the terminal device 101 is authorized (in the application where there is the subsidiary token, the terminal device 101 is authorized after obtaining the authorization information block and the subsidiary token). Then, a task can be issued by the terminal device 101 to the execution device 104.

In an embodiment, the terminal device 101 executes step S211 before issuing a task to the execution device 104.

S211, the authorization information block is output by the terminal device 101 to the execution device 104.

Further, in the application where there is the subsidiary token, in step S211, the subsidiary token bound with the authorization information is also output by the terminal device 101.

In an embodiment, in a practical application, a user initiates a task on the terminal device 101, and a dialog box is popped up by a task issuing software (such as printer driver/printer tool software) in the terminal device 101 to prompt the user to select the authorization information block and enter the subsidiary token.

Further, in step S211, the identity of the object with the authority is output by the terminal device 101 (such as the identity of the terminal device 101, or the user identity of the user account logged in the terminal device 101) to the execution device 104, so as to enable the execution device 104 to verify whether the terminal device 101 is an object with the authority.

Further, in the application where the authorization information includes the client certificate of the offline authorization client, in step S211, the client certificate of the terminal device 101 is output by itself to the execution device 104, so as to enable the execution device 104 to verify whether the terminal device 101 is the client corresponding to the authorization information.

Further, in the application where the authorization information includes the consumable share, in step S211, the consumed amount of the consumable is output by the terminal device 101 to the execution device 104, so as to enable the execution device 104 to calculate the remaining amount of the consumable.

S212, the authorization information block is decrypted by the execution device 104 using the first public key to obtain the authorization information.

S213, legality of the authorization information is verified by the execution device 104.

In an embodiment, in an implementation of step S213, one or more of the following operations are performed by the execution device 104:

- verifying whether the authorizer identity of the authorization information is a legitimate authorizer identity, if not, the authorization information is illegal;
- verifying whether the authorized-object identity of the authorization information is the identity of the object with the authority provided by the terminal device 101 (such as the identity of the terminal device 101, or the user identity of the user account logged in the terminal device 101), if not, the authorization information is illegal;
- verifying whether the authorization moment of the authorization information is the current moment or before the current moment, if not, the authorization information is illegal;
- verifying whether the current moment is within the authorization period of the authorization information, if not, the authorization information is illegal;
- verifying whether the client certificate of the offline authorization client of the authorization information is consistent with the client certificate provided by the terminal device 101, if not, the authorization information is illegal;
- verifying whether the subsidiary token information summary of the authorization information matches the subsidiary token provided by the terminal device 101, if not, the authorization information is illegal; and
- verifying whether the consumed amount of the consumable, provided by the terminal device 101, of the authorization information is lower than the consumable share of the authorization information, if not, the authorization information is illegal.

When the authorization information is illegal, step S214 is executed by the execution device 104.

S214, an authorization failure is fed back to the terminal device 101 by the execution device 104.

When the authorization information is legal, step S215 and step S216 are executed by the execution device 104.

S215, the authority information of the terminal device 101 of the authorization information is obtained by the execution device 104.

In an embodiment, step S214 includes: obtaining the authority range of the authorization information.

Further, in the application where the authorization information includes the consumable share, step S214 includes: obtaining the consumable share of the authorization information; calculating the remaining amount of the consumable based on the consumable share and the consumed amount of the consumable provided by the terminal device 101.

In an embodiment, the remaining amount of the consumable=the consumable share of the authorization information=the consumed amount of the consumable.

S216, a message that the authorization information has been verified is fed back to the terminal device 101 by the execution device 104.

S217, a task is issued by the terminal device 101 to the execution device 104.

For example, in the application where the execution device 104 is a printer, the printer driver/printer tool software of the terminal device 101 sends a printing task to the execution device 104 by submitting print data or issuing a printer operation instruction.

S218, the task is received by the execution device 104.

S219, the execution device 104 determines whether to allow the task to be executed based on the authority information obtained in step S215.

In an embodiment, in an implementation of step S219, one or more of the following operations are performed by the execution device 104:

- determining whether an operation included in the task is within the authority range of the authorization information, if not, it is determined that the task is not allowed to be executed; and determining whether the consumed amount of the consumable for executing the task exceeds the remaining amount of the consumable, when it does, it is determined that the task is not allowed to be executed.

S220, when the task is not allowed to be executed, a prompt message indicating no authority and/or insufficient portion is output by the execution device 104.

In step S220, the prompt message indicating no authority and/or insufficient portion may be output by the execution device 104 through its own output device (such as speaker or display screen), and may also be sent to and then output by the terminal device 101.

S221, when the task is allowed to be executed, the execution device 104 executes the task.

According to the method of the present disclosure, during the authorization process, the execution device 104 does not need to be connected to an authorization device, and the execution device 104 does not require identity information or authority information of the user, thereby reducing a risk of user private data leakage and thus improving the security of the authorization.

Further, an embodiment of the present disclosure provides an indirect authorization method. As shown in FIG. 1, in an embodiment of the present disclosure, the terminal device 101 is authorized by the authority management server 103, and the authority obtained by the terminal device 101 includes that the terminal device 101 can authorize other terminal devices. After obtaining the authority, the terminal device 101 authorizes other terminal devices (such as terminal device 105). The execution device 104 does not store any authorization information. When the execution device 104 authorizes the terminal device 105, the execution device 104 does not need to connect to the authority management server 103.

Figure 4:
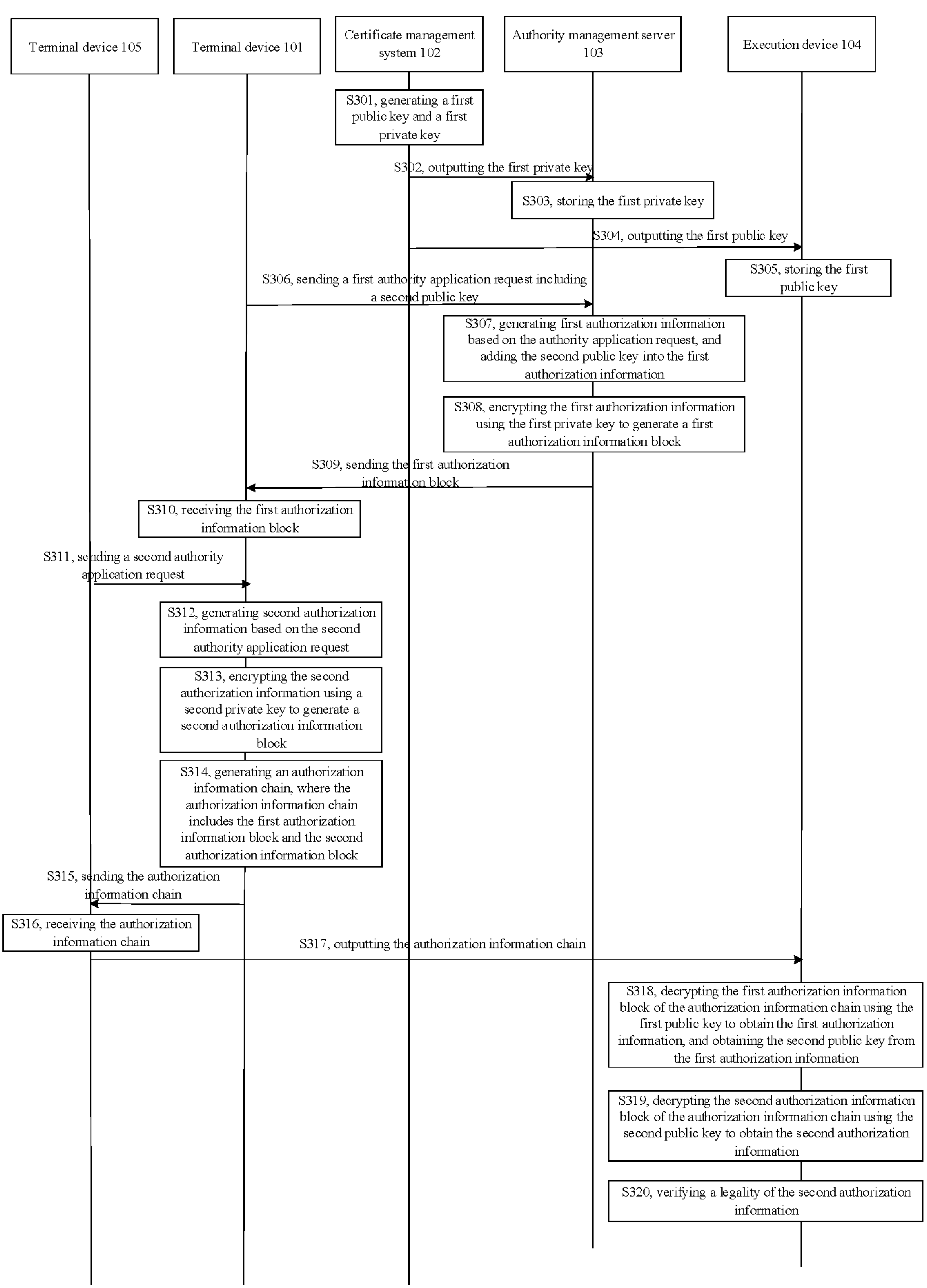
FIG. 4 is a flowchart of an authority management method according to an embodiment of the present disclosure.

FIG. 4 shows a flowchart of an authority management method according to an embodiment of the present disclosure.

The method shown in FIG. 4 is executed by the device shown in FIG. 1 to authorize the terminal device 105.

Step S301 to step S305 can refer to step S201 to step S205.

S306, a first authority application request is sent by the terminal device 101 to the authority management server 103.

The first authority application request is used to apply for a first authority. The first authority represents an authority to allow the terminal device 101 to use it by itself, and represents a usage authority for the execution device 104. The section, of the first authority application request, for the first authority refers to step S206.

Further, the first authority application request is further used to apply for a second authority. The second authority represents an authority to allow the terminal device 101 to authorize another terminal device, and represents a usage authority for the execution device 104. The second authority represents an authority to allow the terminal device 101 to perform secondary authorization.

In an embodiment, in an implementation of step S306, the first authority application request includes a second public key. The second public key and a second private key are asymmetrically encrypted while matching each other. The second public key and the second private key are stored in the terminal device 101. The second public key and the second private key may be generated by the terminal device 101, or generated by another device and then sent to the terminal device 101.

Further, in an implementation of step S306, the first authority application request includes an authorization moment of the second authority (i.e., a moment when the second authority starts taking effect), an authorization period of the second authority (i.e., a period during which the second authority take effects), and an authorization range of the second authority. Further, in the application where the execution device 104 is a printer, the authority application request includes a consumable share of the second authority.

In another implementation of step S306, one or more of the authorization moment, the authorization period, the authority range, and the consumable share of the second authority mentioned above may not be provided by the terminal device 101 (not included in the authority application request (the first request)), but rather by the authority management server 103 searching for the corresponding record in authority registration information based on the identity, in the first authority application request, of the object which desires to obtain the authority.

Further, in an embodiment, one or more of the authorization moment, the authorization period, the authority range, and the consumable share of the second authority may be set to be consistent with those of the first authority.

S307, authorization information (first authorization information) for the first and second authorities is generated by the authority management server 103 based on the first authority application request, and the second public key is added into the first authorization information.

The section, of the first authorization information, for the first authority can refer to step S207.

In an embodiment, in an implementation of step S307, the first authorization information further includes one or more of the authorization moment, the authorization period, the authority range, and the consumable share of the second authority.

S308, the first authorization information is encrypted to be a first authorization information block by the authority management server 103 using the first private key, this can refer to step S208.

Further, in order to improve data security, in an implementation of step S308, a first authorization information block is issued by the authority management server 103 using the administrator certificate. The first authorization information block represents an authorization information block issued by the authority administrator.

S309, the first authorization information block is sent by the authority management server 103 to the terminal device 101, this can refer to step S209.

S310, the first authorization information block is received by the terminal device 101, this can refer to step S210.

Further, in order to improve data security and avoid authorization block leakage which would lead to authority stealing, in an implementation, the authority management server 103 generates a first subsidiary token bound with the first authorization information while generating the first authorization information (in an embodiment, the first subsidiary token is a randomly generated numeric string with a fixed length). In step S309, the first authorization information block and the first subsidiary token bound with the first authorization information are sent by the authority management server 103 to the terminal device 101. The first authorization information block and the first subsidiary tokens may be packaged and sent at once or sent separately.

In an embodiment, in an implementation of step S307, the first authorization information further includes the subsidiary token information summary. A binding relationship between the first authorization information and the first subsidiary token may be verified by verifying a matching relationship between the subsidiary token and the first subsidiary token information summary of the first authorization information.

FIG. 5 shows a schematic diagram of an authorization information block according to an embodiment of the present disclosure.

As shown in FIG. 5, the authorization information block includes an authorizer identity, an authorized-object identity, an authorized-object public key (second public key) authorization moment, an authorization period, a subsidiary token information summary, a client certificate of an offline authorization client, an authority range (an authority range of a first authority), an authority range allowed to perform secondary authorization (a range of ta second authority), a consumable share, a Hash signature, and other additional information.

After the first authorization information block is obtained by the terminal device 101, the terminal device 101 can authorize other terminal device based on the first authorization information block. Taking the terminal device 105 as an example, the following process is executed by the terminal device 101 and the terminal device 105 to make the terminal device 101 authorize the terminal device 105.

S311, a second authority application request is sent by the terminal device 105 to the terminal device 101.

The second authority application request is used to apply for a third authority. The third authority represents an authority to allow the terminal device 105 to use it by itself, and represents a usage authority for the execution device 104. The section, of the second authority application request, for the third authority refers to the section, of the first authority application request in step S206 and step S306, for the first authority.

S312, the terminal device 101 generates a second authorization information for the third authority based on the second authority application request, this can refer to the section, of the first authorization information in step S207 and step S307, for the first authority.

S313, the second authorization information is encrypted by the terminal device 101 using the second private key to generate a second authorization information block.

Further, in order to improve data security, in an implementation of step S313, the second authorization information block is issued by the terminal device 101 using a personal certificate of the terminal device 101 (belonging to the personal certificate of the terminal device 101, or the personal certificate of the user account logged in the terminal device 101 with a second authority). The second authorization information block represents an authorization information block issued by the terminal device 101 or the user account logged in the terminal device 101.

S314, an authorization information chain is generated by the terminal device 101. The authorization information chain includes a first authorization information block and a second authorization information block.

S315, the authorization information chain is sent by the terminal device 101 to the terminal device 105.

S316, the authorization information chain is received by the terminal device 105.

Further, in an embodiment, in the application where the first authorization information block and the first subsidiary token bound with the first authorization information are sent by the authority management server 103 to the terminal device 101, in step S315, a first subsidiary token bound with the first authorization information is also sent by the terminal device 101 to the terminal device 105.

Further, in another embodiment, the printer does not need to verify legality of the first authorization information block of the authorized user, as long as it decrypts that a public key thereof is used to decrypt the second information block. Therefore, in the application where the first authorization information block and the first subsidiary token bound with the first authorization information are sent by the authority management server 103 to the terminal device 101, in step S315, the first subsidiary token may not be sent by the terminal device 101 to the terminal device 105.

Further, in an implementation, in order to improve data security and avoid authorization block leakage which would lead to authority stealing, the terminal device 101 generates a second subsidiary token bound with the second authorization information while generating the second authorization information (in an embodiment, the second subsidiary token is a randomly generated numerical string with a fixed length). In step S315, the second subsidiary token bound with the second authorization information is further sent by the terminal device 101 to the terminal device 105.

After the authorization information chain is obtained by the terminal device 105, the terminal device 105 is authorized (in the application scenarios where there is the subsidiary token, the terminal device 105 is authorized after obtaining the authorization information chain and the subsidiary token). Then, a task can be issued by the terminal device 105 to the execution device 104.

In an embodiment, the terminal device 105 executes step S317 before issuing a task to the execution device 104.

S317, the authorization information chain is output by the terminal device 105 to the execution device 104, this can refer to step S211.

S318, the first authorization information block of the authorization information chain is decrypted by the execution device 104 using the first public key to obtain the first authorization information, and the second public key is obtained from the first authorization information.

S319, the second authorization information block of the authorization information chain is decrypted by the execution device 104 using the second public key to obtain the second authorization information.

S320, legality of the second authorization information is verified by the execution device 104, this can refer to step S213.

When the second authorization information is illegal, an authorization failure is fed back to the terminal device 101 by the execution device 104, this can refer to step S214.

When the second authorization information is legal, the authority information of the terminal device 105 of the second authorization information is obtained by the execution device 104, and a message that the authorization information has been verified is fed by to the terminal device 105 by the execution device 104. Then a task is issued by the terminal device 105 to the execution device 104, which can refer to step 215 to step S221.

Further, in an implementation, the second authority application request in step S311 is further used to apply for a fourth authority. The fourth authority represents an authority that the terminal device 105 is allowed to authorize other terminal device, and represents a usage authority for the execution device 104. The fourth authority represent an authority to allow the terminal device 105 to perform secondary authorization.

In an embodiment, in an implementation of step S311, the second authority application request includes a third public key. The third public key and a third private key are asymmetrically encrypted while matching each other. The third public key and the third private key are stored in the terminal device 105. The third public key and the third private key may be generated by the terminal device 105, or generated by other devices and then sent to the terminal device 105.

The section, of the second authority application request, for the fourth authority can refer to the section, of the first authority application request in step S306, for the second authority.

In step S312, the second authorization information for the third authority and the fourth authority is generated by the terminal device 101 based on the second authority application request, and the third public key is added into the second authorization information, this can refer to step S307.

After the authorization information chain (including the first authorization information block containing the second public key and the second authorization information block containing the third public key) is obtained by the terminal device 105, the terminal device 105 can authorize other terminal device. Taking a terminal device 106 as an example, the process of the authorization from the terminal device 105 to the terminal device 106 can refer to the process of the authorization from the terminal device 101 to the terminal device 105 (step S311 to step S316).

In an embodiment, third authorization information is generated by the terminal device 105 based on the authority application request of the terminal device 106. The third authorization information is encrypted by the terminal device 105 using the third private key to generate a third authorization information block. The third authorization information block is issued by the terminal device 105 using a personal certificate of the terminal device 105 (belonging to the personal certificate of the terminal device 105, or the personal certificate of the user account logged in the terminal device 105 with the fourth authority). That is, the third authorization information block represents an authorization information block issued by the terminal device 105 or the user account logged in the terminal device 105.

The authorization information chain including the first authorization information block, the second authorization information block, and the third authorization information block is sent by the terminal device 105 to the terminal device 106 to authorize the terminal device 106.

The terminal device 106 outputs the authorization information chain to the execution device 104 before issuing a task to the execution device 104. The execution device 104 decrypts the first authorization information block of the authorization information chain using the first public key to obtain the first authorization information, and obtains the second public key from the first authorization information. The execution device 104 decrypts the second authorization information block of the authorization information chain using the second public key to obtain the second authorization information, and obtains the third public key from the second authorization information. The execution device 104 decrypts the third authorization information block of the authorization information chain using the third public key to obtain the third authorization information, and verifies the legality of the second authorization information. This can refer to step S317 to step S320.

According to the method of the embodiments of the present disclosure, the terminal devices can be used to achieve multi-level authorization.

FIG. 6 shows a schematic diagram of an authority topology for multi-level authorization according to an embodiment of the present disclosure.

For example, when a terminal device A obtains an authorization from an authority management server and has an authority for secondary authorization, a terminal device B may apply for an authority from the terminal device A (the secondary authorizer) to further obtain an authority for secondary authorization; and a terminal device C may obtain the authorization from the terminal device B (the tertiary authorizer), which means that the terminal device can obtain the authorization with the method for obtaining authorization level by level. A terminal device D may also obtain the authorization from the terminal device B, which means that the terminal device D obtains the authorization with the method for obtaining authorization level by level.

A terminal device E may also apply for the authority from the terminal device A to further obtain the authority for secondary authorization. Then, terminal devices F and G may obtain the authorization from the terminal device E, which means that the terminal device F and G obtain the authorization with the method for obtaining authorization level by level.

In an embodiment, in the application of multi-level authorization, when the terminal device obtains the authorization, the authorization information chain that is obtained includes the authorization information generated by the terminal device used for authorization at each previous level.

Taking FIG. 6 as an example, the terminal device A (the authorized device at a first level, the secondary authorizer) obtains the authorization information block generated by the authority management server for the terminal device A. The terminal device B (the authorized device at a second level, the tertiary authorizer) obtains the authorization information block for the terminal device A and the authorization information block generated by the terminal device A for the terminal device B. The terminal device C (the authorized device at a third level) obtains the authorization information block for the terminal device A, the authorization information block for the terminal device B, and the authorization information block generated by the terminal device B for the terminal device C.

Figure 7:
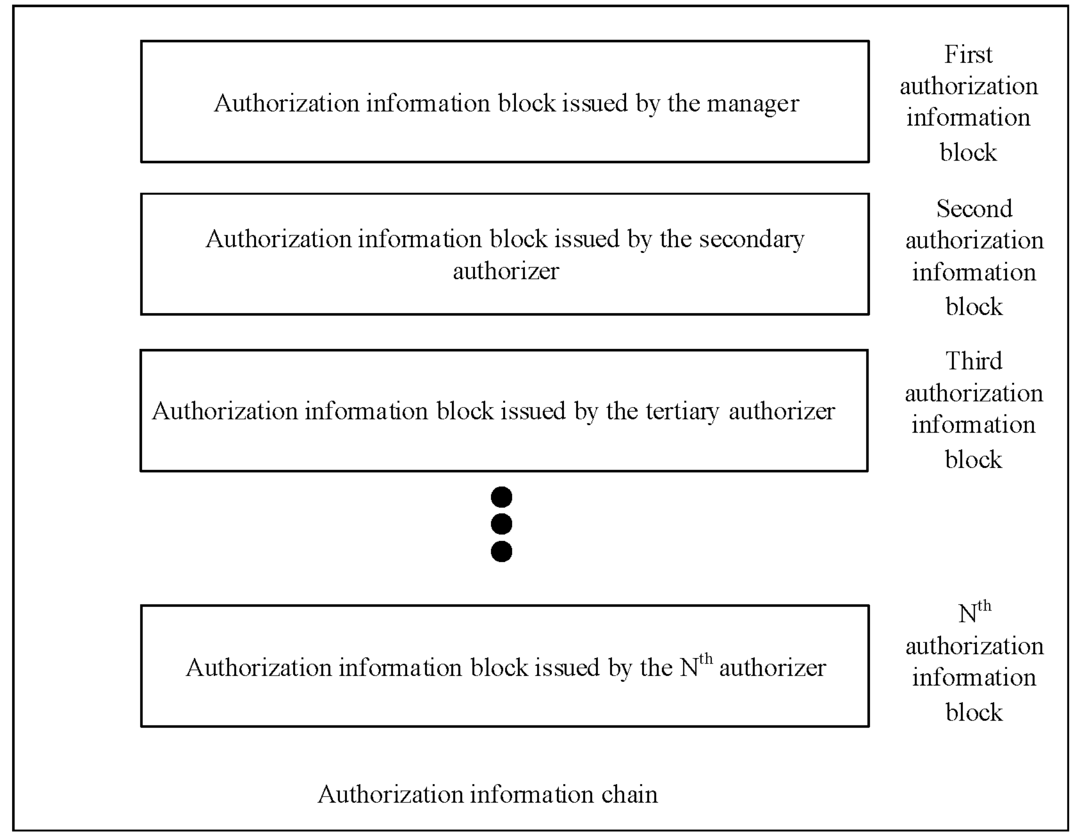
FIG. 7 is a schematic diagram of an authorization information chain according to an embodiment of the present disclosure.

FIG. 7 shows a schematic diagram of an authorization information chain according to an embodiment of the present disclosure.

The authorization information chain obtained by the authorized terminal device at an $N^{th}$ level is shown in FIG. 7. The authorization information chain includes a first authorization information block, a second authorization information block, a third authorization information block, . . . , and an $N^{th}$ authorization information block. The first authorization information block, the second authorization information block, the third authorization information block, . . . , and the $N^{th}$ authorization information block may be the authorization information block issued by the administrator (such as the authority management server 103), the authorization information block issued by the secondary authorizer (such as the terminal device 101), the authorization information block issued by the tertiary authorizer (such as the terminal device 105), . . . , the authorization information block issued by the $N^{th}$ authorizer.

In the description of the embodiments of the present disclosure, for the convenience of description, during the description of the device, it is divided into various modules according to their functions and described separately, and the division of these modules is only a division based on logical functions. When implementing the embodiments of the present disclosure, the function of each module may be implemented in the same or multiple software and/or hardware.

For example, the device provided in the embodiments of the present disclosure may be fully or partially integrated into a physical entity during actual implementations, or may be physically separated. These modules may all be implemented in the form of software(s) through the call of the processing element(s), or in the form of hardware(s). Alternatively, some modules may be implemented in the form of software(s) through the call of the processing element(s), while others may be implemented in the form of hardware(s). For example, a detection module may be a separately set processing element, or may be integrated into a chip in an electronic device. The implements of other modules are similar. In addition, all or part of these modules may be integrated together or implemented independently. During the implementation process, each step or module of the above methods can be implemented through integrated logic circuits of hardware(s) of the processing element(s) or instructions in the form of software(s).

For example, the above modules may be one or more integrated circuits configured to implement the above methods, such as one or more application specific integrated circuits (ASICs), one or more digital signal processors (DSPs), or one or more field programmable gate arrays (FPGAs). For example, these modules may be integrated together and implemented in the form of System-On-a-Chip (SOC).

An embodiment of the present disclosure further provides an electronic device, which includes a memory for storing computer program instructions and a processor for executing the program instructions. In an embodiment, when the computer program instructions are executed by the processor, the electronic device is triggered to execute one of the methods described in the embodiments of the present disclosure.

For example, in an embodiment of the present disclosure, one or more of the above computer programs are stored in the above memory, and one or more of the above computer programs include instructions that, when executed by the above device, cause the device to execute the methods described in the embodiments of the present disclosure.

For example, in an embodiment of the present disclosure, the processor of the electronic device may be a System-On-a-Chip SOC, which may include a central processing unit (CPU) and further include other types of processors. For example, in an embodiment of the present disclosure, the processor of the electronic device may be a PWM control chip.

For example, in an embodiment of the present disclosure, the related processor may include, for example, a CPU, DSP, microcontroller, or digital signal processor, as well as a GPU, embedded neural-network process units (NPU), and image signal processing (ISP). The processor may further include necessary hardware accelerators or logic processing hardware circuits, such as ASIC, or one or more integrated circuits configured to control the program execution of the technical solution of the present disclosure. In addition, the processor may have the ability to operate one or more software programs, which can be stored in a storage medium.

For example, in an embodiment of the present disclosure, the memory of the electronic device may be read-only memory (ROM), other types of static storage devices that can store static information and instructions, random access memory (RAM), or other types of dynamic storage devices that can store information and instructions. The memory of the electronic device may also be electrically erasable programmable read-only memory (EEPROM), compact disc read-only memory (CD-ROM) or other compact disc storage, optical disc storage (including compressed optical disc, laser disc, optical disc, digital universal disc, Blu-ray disc, etc.), disk storage medium, or other magnetic storage devices. Alternatively, the memory of the electronic device may also be any computer-readable medium that can be used to carry or store desired program codes in the form of instructions or data structures and can be accessed by the computer.

For example, in an embodiment of the present disclosure, the processor and the memory may be integrated into a processing device, more commonly they are independent components. The processor is configured to execute the program codes stored in the memory to implement the method described in the embodiments of the present disclosure. During the implementation, the memory may also be integrated into the processor or independent of the processor.

Further, the device, apparatus, and module described in the embodiments of the present disclosure may be implemented by the computer chip or entity, or by a product with a certain function.

Those skilled in the art should understand that the embodiments of the present disclosure may provide methods, devices, or computer program products. Therefore, the present disclosure may take the form of complete hardware embodiments, complete software embodiments, or embodiments combining software and hardware embodiments. In addition, the present disclosure may take the form of a computer program product implemented on one or more computer available storage media containing computer available program codes.

In some embodiments of the present disclosure, if any function is implemented in the form of a software functional unit and sold or used as an independent product, it can be stored in the computer-readable storage medium. Based on this understanding, the portion of the technical solution of the present disclosure that essentially contributes to the prior art, or the portion of the technical solution, can be reflected in the form of a software product. The computer software product is stored in the storage medium, and includes some instructions to enable a computer device (which may be a personal computer, server, network device, etc.) to perform all or part of the steps of the methods described in the various embodiments of the present disclosure.

For example, in an embodiment of the present disclosure, a computer-readable storage medium is also provided, and stores computer programs. When the computer programs run on the computer, the computer is caused to execute the methods provided by the embodiments of the present disclosure.

An embodiment of the present disclosure further provides a computer program product, which includes computer programs. When the computer programs run on a computer, the computer is caused to execute the methods provided by the embodiments of the present disclosure.

The embodiments of the present disclosure are described with reference to the flowchart and/or block diagram of the methods, devices (apparatus), and computer program products according to the embodiments of the present disclosure. It should be understood that the combination of each process and/or block in the flowchart and/or the block diagram, and the combination thereof can be implemented by computer program instructions. The processor that transfers these computer program instructions to a general computer, specialized computer, embedded processor, or other programmable data processing device can be provided to form a machine, to form a device configured to implement the functions specified in one or more processes of the flowchart and/or one or more blocks of the block diagram, through instructions executed by the processors of the computer of other programmable data processing devices.

These computer program instructions can also be stored in computer-readable memory that can guide the computer or other programmable data processing devices to work in a specific way, causing the instructions stored in the computer-readable memory to form a manufacturing product including instruction devices, which are configured to implement the functions specified in one or more processes of the flowchart and/or one or more blocks of the block diagram.

These computer program instructions may also be loaded onto the computer or other programmable data processing devices to perform a series of operational steps on the computer or other programmable devices to generate computer-implemented processing, and thus the instructions executed on the computer or other programmable devices provide steps for implementing the functions specified in one or more processes of the flowchart and/or one or more blocks of the block diagram.

It should also be noted that in the embodiments of the present disclosure, "at least one" refers to one or more, and "a plurality of/multiple" refers to two or more. "And/or" is used to describe the association relationship of the associated object, indicating that there can be three types of relationships. For example, "A and/or B" can represent the situation where A exists alone, A and B exist simultaneously, and B exists alone. "A" and "B" can be singular or plural. The character "/" generally indicates that the objects associated before and after are in an "or" relationship. "At least one of the following" and similar expressions refer to any combination of these items, including any combination of singular or plural items. For example, at least one of a, b, or c can represent: a, b, c, a and b, a and c, b and c, or a and b and c, where a, b, and c can be single or multiple.

In the embodiments of the present disclosure, terms "include", "contain", or any other variation thereof are intended to cover non-exclusive inclusion, such that the process, method, commodity, or device that includes a series of elements not only includes those elements, but also other elements not explicitly listed, or further includes the inherent elements of the process, method, commodity, or device. Without further limitations, the elements limited by the statement "including one . . . " do not exclude the existence of other identical elements in the process, method, commodity, or device that includes the said elements.

The present disclosure can be described in the general context of computer executable instructions executed by the computer, such as program module. Generally, the program module includes routines, programs, objects, components, data structures, etc. that perform specific tasks or implement specific abstract data types. The present application can also be practiced in the distributed computing environment where tasks are executed by remote processing devices connected through communication networks. In the distributed computing environment, the program module can be located on local and remote computer storage medium which includes storage devices.

The embodiments of the present disclosure are described in a progressive manner, and the same and similar parts in these embodiment can be referred to each other. Each embodiment focuses on the differences from another embodiment. Especially for the device embodiments, as they are basically similar to the method embodiments, the description is relatively simple. Please refer to the partial description of method embodiments for relevant information.

Those skilled in the art can realize that the various units and algorithm steps described in the embodiments of the present disclosure can be implemented in electronic hardware, and in the combination of computer software and electronic hardware. Whether these functions are executed in hardware or software depends on the specific application and design constraints of the technical solution. Those skilled in the art may use different methods for each specific application to implement the described functions, but such implement should not be considered beyond the scope of the present disclosure.

Those skilled in the art can understand that for the convenience and conciseness of the description, the specific working process of the device, apparatus, and unit described above can refer to the corresponding process of the aforementioned method embodiments, and will not be repeated herein.

The above description is only the description of the embodiments of the present disclosure. Within the technical scope disclosed by the present disclosure, any changes or replacements that can easily be thought of by the technicians familiar with this technical field should be covered within the protection scope of the present disclosure. The protection scope of the present disclosure shall be based on the protection scope of the claims.

What is claimed is:

1. An authority management method, comprising:

a first terminal device sending a first authority application request to an authority management device, receiving a first authorization information block sent by the authority management device, wherein the first authorization information block comprises first authorization information encrypted by a first private key;

the authority management device receiving the first authority application request sent by the first terminal device, generating the first authorization information based on the first authority application request, encrypting the first authorization information using a first private key to generate the first authorization information block, sending the first authorization information block to the first terminal device;

wherein the first authority application request is used to apply for a first authority, the first authority is an authority that is desired to be obtained by the first terminal device, and the first authority is a task authority for an execution device; the first authorization information comprises description information for the first authority, the first private key is a key matching a first public key, and the first public key is stored in the execution device;

wherein the first authority application request comprises a second public key, the second public key is a key matching a second private key, and the second public key and the second private key are stored in the first terminal device;

wherein the first authority application request is further configured to apply for a second authority, the second authority is an authority that allows the first terminal device to authorize another terminal device, and the second authority is a task authority for the execution device; and wherein the first authorization information further comprises description information for the second authority, and the second public key.

2. The method according to claim 1, further comprising: sending the first authorization information block to the execution device when a task needs to be sent to the execution device.

3. The method according to claim 1, further comprising: receiving a second authority application request sent by a second terminal device, wherein the second authority application request is configured to apply for a third authority, the third authority is an authority that is desired to be obtained by the second terminal device, and the third authority is a task authority for the execution device;

generating second authorization information based on the second authority application request, wherein the second authorization information comprises description information for the third authority;

encrypting the second authorization information using the second private key to generate a second authorization information block;

generating a first authorization information chain, wherein the first authorization information chain comprises the first authorization information block and the second authorization information block; and sending the first authorization information chain to the second terminal device.

4. The method according to claim 3, wherein the second authority application request comprises a third public key, the third public key is a key matching a third private key, and the third public key and the third private key are stored in the second terminal device;

the second authority application request is further configured to apply for a fourth authority, the fourth authority is an authority that allows the second terminal device to authorize another terminal device, and the fourth authority is a task authority for the execution device; and during said generating second authorization information based on the second authority application request, the second authorization information further comprises description information for the fourth authority, and the third public key.

5. The method according to claim 1, wherein the first authorization information comprises one or a combination of an authorizer identity, an authorized-object identity, an authorization moment, an authorization period, an authority range, and a consumable share.

6. The method according to claim 1, wherein the first authorization information comprises a subsidiary token information summary of a subsidiary token bound with the first authorization information; and the method further comprises: receiving the subsidiary token sent by the authority management device; generating the subsidiary token; and sending the subsidiary token to the first terminal device.

7. An authority management method, applied to a second terminal device and comprising:

sending a second authority application request to a first terminal device, wherein the second authority application request is configured to apply for a third authority, the third authority is an authority that is desired to be obtained by the second terminal device, and the third authority is a task authority for an execution device; and receiving a first authorization information chain sent by the first terminal device, wherein the first authorization information chain comprises authorization information blocks;

wherein a first one authorization information block of the authorization information blocks of the first authorization information chain comprises first authorization information encrypted by a first private key, the first private key is a key matching a first public key, and the first public key is stored in the execution device;

each authorization information block of the first authorization information chain comprises authorization information encrypted by a private key;

the authorization information of each authorization information block of the first authorization information chain comprises a public key matching the private key configured to encrypt the authorization information in a next one authorization information block; and the authorization information of a last one authorization information block of the authorization information blocks of the first authorization information chain comprises description information for the third authority; and wherein a first authority application request is sent by the first terminal device to an authority management device, and is used to apply for a first authority and a second authority, the first authority is an authority that is desired to be obtained by the first terminal device, the second authority is an authority that allows the first terminal device to authorize another terminal device, a second authorization information is generated by the authority management device based on the second authority application request, and the second authorization information comprises description information for the third authority.

8. The method according to claim 7, further comprising: sending the first authorization information chain to the execution device when a task needs to be sent to the execution device.

9. The method according to claim 7, wherein the second authority application request comprises a third public key, the third public key is a key matching a third private key, and the third public key and the third private key are stored in the second terminal device;

the second authority application request is further configured to apply for a fourth authority, the fourth authority is an authority that allows the second terminal device to authorize another terminal device, and the fourth authority is a task authority for the execution device; and the authorization information of the last one authorization information block of the authorization information blocks of the first authorization information chain further comprises description information for the fourth authority, and the third public key.

10. The method according to claim 9, further comprising: receiving a third authority application request sent by a third terminal device, wherein the third authority application request is configured to apply for a fifth authority, the fifth authority is an authority that is desired to be obtained by the third terminal device, and the fifth authority is a task authority for the execution device;

generating third authorization information based on the third authority application request, wherein the third authorization information comprises description information for the fifth authority;

encrypting the third authorization information using the third private key to generate a third authorization information block;

adding the third authorization information block to a tail of the first authorization information chain to generate a second authorization information chain; and sending the second authorization information chain to the third terminal device.

11. The method according to claim 7, wherein authorization information of each authorization information block of the first authorization information chain comprises one or a combination of an authorizer identity, an authorized-object identity, an authorization moment, an authorization period, an authority range, and a consumable share.

12. The method according to claim 7, wherein the first authorization information comprises a subsidiary token information summary of a subsidiary token bound with the first authorization information; and the method further comprises: receiving the subsidiary token sent by the first terminal device.

13. An authority management method, applied to an execution device and comprising:

receiving a first authorization information block sent by a terminal device, wherein the first authorization information block comprises first authorization information encrypted by a first private key, the first private key is a key matching a first public key, and the first public key is stored in the execution device; and decrypting the first authorization information block using the first public key to obtain the first authorization information;

wherein said receiving a first authorization information block sent by a terminal device comprises: receiving an authorization information chain sent by the terminal device, wherein the authorization information chain comprises authorization information blocks encrypted by different private keys, a first one authorization information block of the authorization information blocks of the authorization information chain is the first authorization information block, and an authorization information of each authorization information block of the authorization information chain comprises a public key matching a private key configured to encrypt the authorization information in a next one authorization information block; and the method further comprises:

obtaining a public key matching the next one authorization information block from the authorization information of each decrypted authorization information block to decrypt the next one authorization information block, and obtaining the authorization information of the next one authorization information block, wherein the public key matching a second authorization information block is obtained from the first authorization information to decrypt the second authorization information block, to obtain the authorization information of the second authorization information block;

verifying legality of the authorization information of a last one authorization information block of the authorization information blocks of the authorization information chain;

obtaining authority information of the terminal device based on the authorization information of the last one authorization information block of the authorization information blocks in response to verification success of the authorization information of the last one authorization information block of the authorization information blocks; and determining whether to execute a task issued by the terminal device based on the authority information of the terminal device.

14. The method according to claim 13, wherein the first authorization information block is generated by an authority management device based on an authority application request of the terminal device.

15. The method according to claim 13, further comprising:

verifying legality of the first authorization information;

obtaining authority information of the terminal device based on the first authorization information in response to verification success of the first authorization information; and determining whether to execute a task issued by the terminal device based on the authority information of the terminal device.

16. The method according to claim 13, wherein the first authorization information comprises one or a combination of an authorizer identity, an authorized-object identity, an authorization moment, an authorization period, an authority range, and a consumable share.

17. The method according to claim 13, wherein the first authorization information comprises a subsidiary token information summary of a subsidiary token bound with the first authorization information; and the method further comprises: receiving the subsidiary token sent by the terminal device, and verifying whether the subsidiary token matches the first authorization information.

* * * * *